UNITED STATES PATENT OFFICE.

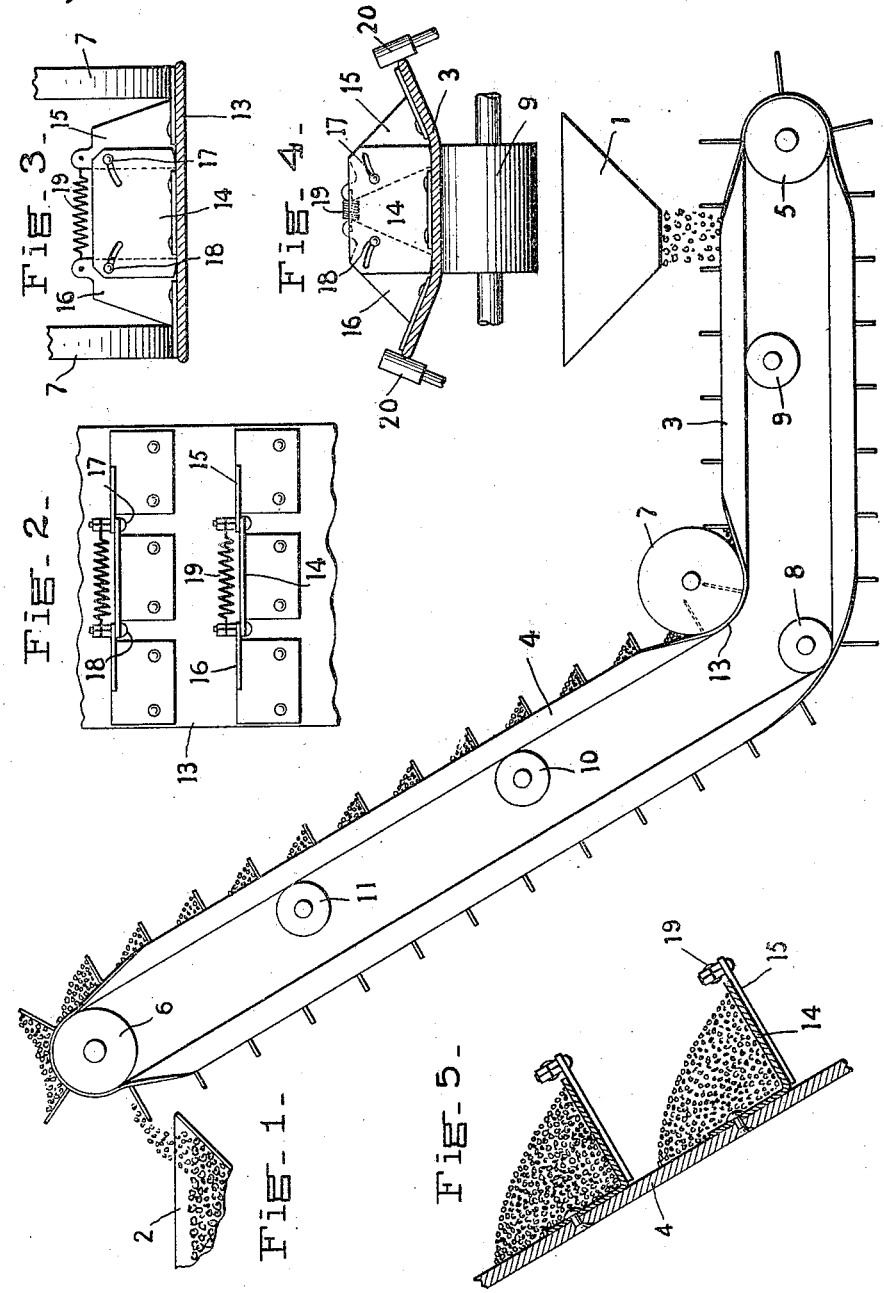

EARL C. L. VAN WERT, OF VALHALLA, NEW YORK.

CONVEYER.

999,419.

Specification of Letters Patent.

Patented Aug. 1, 1911.

Application filed June 8, 1910. Serial No. 565,686.

*To all whom it may concern:*

Be it known that I, EARL C. L. VAN WERT, a citizen of the United States, residing at Valhalla, in the county of Westchester and State of New York, have invented certain new and useful Improvements in Conveyers, of which the following is a specification.

My invention relates particularly to what are generally known as belt conveyers for moving materials of various kinds.

When the material to be conveyed is of a granulated or finely divided nature the amount which can be carried by a belt is limited by the tendency of the material to spread out and fall over the edge of the belt. The limit is determined by the angle of repose of the material. In order to increase the capacity of a given width of belt it is common practice to raise the edges of the belt by means of inclined rollers so that the belt takes the form of a trough. These rollers are commonly termed troughing idlers. The ordinary troughed belt will carry material horizontally and up any incline to about 20°. When it is desired to carry material up an angle greater than 20° it is necessary to employ what is commonly termed a bucket conveyer, that is, a belt having a series of buckets. These bucket conveyers are however seldom if ever used for carrying material horizontally. If material is to be carried horizontally and also elevated to a considerable distance it is customary to employ a troughed-belt conveyer for carrying the material horizontally. From this troughed belt the material is emptied into a hopper or boot from which it is elevated by means of a bucket-conveyer.
It is the principal object of my invention to combine the advantages of the bucket and trough conveyer in a single structure so that the material when deposited upon the conveyer can be transported horizontally as well as up a steep incline.

Another object is to maintain a belt in a uniform troughed condition between the drive pulleys and prevent the edges of the belt from sagging.
Another object is to do away with the necessity of troughing idlers.

The invention consists in the combination of a belt with a special form of buckets which for convenience may be called "flexible."

The principles will be understood from the following specification and the accompanying drawing.

Figure 1, is a diagrammatic side view of a conveyer embodying the principles of my invention. Fig. 2, is a plan view of a fragment of a conveyer of my invention the belt being flat, and the buckets extended. Fig. 3, is a transverse sectional view of the same. Fig. 4, is a transverse sectional view of the conveyer in its troughed condition and showing idlers. Fig. 5, is a vertical sectional view of an inclined portion of the conveyer on a somewhat larger scale.

The reference numeral 1 indicates the distributing hopper from which material is to be conveyed to the receiving hopper 2.

3 is a horizontal portion of the conveyer and 4 the inclined portion. The conveyer runs around drums or pulleys such as 5 and 6 at opposite ends either or both of which may supply driving power. At the point where the conveyer begins to rise, a pair of disk-like pulleys or guides such as 7, 7 are employed at the upper or carrying face of the conveyer and an idler such as 8 at the lower part of the conveyer. Any suitable number of idlers such as 9, 10 and 11 may be employed at the necessary points according to the necessity of the case. Throughout most of its extent the conveyer is troughed but it is allowed to flatten as at 13 where it passes the guide disks 7, 7, the idler 8 and the driving drums or pulleys 5 and 6.

The body or belt portion of the conveyer may be of any suitable character with sufficient flexibility to permit the belt to be troughed as shown in Fig. 4. Attached to the outer surface of the belt in any suitable manner as for instance, by riveting, are the buckets. In its preferred form each bucket is made up of three portions, a central member 14 and two lateral members 15 and 16 which over-lap the edges of the central member except where the members are attached to the belt at which points there is left considerable space so as to allow the side portions of the belt to be bent up into the troughed form of Fig. 4. From this it will be seen that the side members 15 and 16 are in a sense hinged relative to the central member 14, the axis of the hinged action being in the plane of the belt and longitudinally thereof at the angles of the trough. I prefer to limit the relative swinging action by suitable means as for instance, a pin and slot connection such as 17 and 18. I also prefer to provide means for drawing the outer ends of the lateral members 15 and 16 together such for instance as a spring 19. The side members may be provided with projections as shown in Fig. 3 to which the ends of the spring are attached in any suitable manner. By placing the spring 19 above the top of the central member 14 I avoid difficulties which might occur if the spring were located lower down where the material being conveyed rests against the buckets. The spring 19 automatically holds the conveyer in a troughed condition except when the conveyer passes around the driving drums or pulleys and the guide-disks 7, 7 at which times the spring yields sufficiently to permit the belt to flatten out and the bucket to extend laterally as shown in Fig. 3. As soon as the belt has passed the guide disks or driving pulleys the spring 19 will bring the belt immediately into its troughed condition.

If desired, lateral guide devices or idlers such as 20, 20 may be employed as is sometimes done with troughed conveyers to prevent lateral displacement. If desired my conveyer may be used with an ordinary set of pulleys and idlers including troughing idlers and in this case the springs 19, 19, if used, would relieve the troughing idlers of most of the bearing pressure. Some of the advantages of my invention would be had even if the springs were omitted.

It will also be obvious that changes in the style and design of the buckets may be made without departing from the spirit or scope of my invention.

The advantages of the features above pointed out will be apparent to those skilled in this art.

What I claim is:—

1. A conveyer comprising a belt, laterally flexible buckets carried thereby and means carried by the belt for normally holding the belt in a troughed condition and the buckets contracted.

2. In a conveyer, a belt, a series of buckets carried thereby each consisting of a plurality of parts arranged side by side across the belt and over-lapping one another at all times.

3. In a conveyer, a belt, a series of buckets carried thereby each consisting of a plurality of parts arranged side by side across the belt and over-lapping one another and inter-engaging means carried by the parts of a bucket for limiting the relative swinging motion of said parts.

4. In a conveyer, a belt, a plurality of buckets carried thereby each consisting of a plurality of parts arranged side by side across the belt and means carried by the belt for drawing the outer parts toward each other and holding the conveyer in a troughed condition.

5. In a conveyer, a belt, a series of buckets carried thereby each consisting of a plurality of parts arranged side by side across the belt and a spring connecting said parts tending to trough the belt.

6. In a conveyer, a belt, a series of buckets carried thereby each consisting of a plurality of parts arranged side by side across the belt and over-lapping each other and capable of relative transverse movement and a pin and slot connection between said parts for limiting the relative motion.

7. In a conveyer, a belt, a series of buckets carried thereby each consisting of a plurality of parts arranged side by side across the belt and over-lapping each other and a spring for drawing the outer parts toward each other.

8. A conveyer comprising a belt, suitable driving, guiding and idler pulleys for maintaining a part of the belt substantially horizontal and a part of the belt at a steep inclination relative thereto, a series of laterally flexible buckets carried by said belt and extending across the same substantially from one side to the other and means carried by said belt for maintaining said belt in a troughed condition and said buckets contracted independently of the load.

9. A conveyer comprising a flexible belt, a bucket secured thereto and consisting of a central member and two side members adapted to extend and contract to allow the belt to lie flat or be troughed and interengaging means carried by said members to limit the movement of the side members relative to the central member.

10. In a conveyer, a belt, means carried by said belt including a spring for troughing the belt.

11. In a conveyer, a belt, segmental buckets carried thereby and springs for pulling the segments of the buckets together and troughing the belt.

12. In a conveyer, a belt, and means secured to the belt on its load-carrying face for bending said belt into trough-shaped form but allowing the belt to flatten out.

13. In a conveyer, a belt, pulleys therefor around which the belt passes substantially flat and means carried by said belt independent of the load for automatically troughing said belt when between the pulleys.

14. In a conveyer, a belt, pulleys therefor, buckets carried by said belt and means connecting with said buckets for troughing the belt but permitting the belt to pass flat around said pulleys.

15. In a conveyer, a belt, segmental buckets carried thereby and means connecting with said buckets for troughing said belt.

EARL C. L. VAN WERT.

Witnesses:
ARTHUR J. TAYLOR,
CHARLES O. TESSIER.